(12) United States Patent
Yang et al.

(10) Patent No.: US 11,074,904 B2
(45) Date of Patent: Jul. 27, 2021

(54) SPEECH SYNTHESIS METHOD AND APPARATUS BASED ON EMOTION INFORMATION

(71) Applicant: LG Electronics Inc., Seoul (KR)

(72) Inventors: Siyoung Yang, Seoul (KR); Minook Kim, Seoul (KR); Sangki Kim, Seoul (KR); Yongchul Park, Seoul (KR); Juyeong Jang, Seoul (KR); Sungmin Han, Seoul (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 16/593,161

(22) Filed: Oct. 4, 2019

(65) Prior Publication Data

US 2020/0035215 A1 Jan. 30, 2020

(30) Foreign Application Priority Data

Aug. 22, 2019 (KR) .......................... 10-2019-0103238

(51) Int. Cl.
*G10L 13/00* (2006.01)
*G10L 13/02* (2013.01)
(Continued)

(52) U.S. Cl.
CPC .............. *G10L 13/02* (2013.01); *G06F 17/16* (2013.01); *G10L 15/30* (2013.01); *G10L 25/30* (2013.01); *G10L 25/63* (2013.01)

(58) Field of Classification Search
None
See application file for complete search history.

(56) References Cited

U.S. PATENT DOCUMENTS

| | | | |
|---|---|---|---|
| 2008/0235024 A1* | 9/2008 | Goldberg | ............... G10L 13/00 704/260 |
| 2011/0184721 A1* | 7/2011 | Subramanian | ...... G10L 19/0018 704/4 |
| 2013/0262096 A1* | 10/2013 | Wilhelms-Tricarico | ..................... G10L 13/04 704/202 |

OTHER PUBLICATIONS

N. Tits, "A Methodology for Controlling the Emotional Expressiveness in Synthetic Speech—a Deep Learning approach," 2019 8th International Conference on Affective Computing and Intelligent Interaction Workshops and Demos (ACIIW), Cambridge, UK, 2019, pp. 1-5. (Year: 2019).*

(Continued)

*Primary Examiner* — Edgar X Guerra-Erazo
(74) *Attorney, Agent, or Firm* — Fish & Richardson P.C.

(57) ABSTRACT

A speech synthesis method and apparatus based on emotion information are disclosed. A speech synthesis method based on emotion information extracts speech synthesis target text from received data and determines whether the received data includes situation explanation information. First metadata corresponding to first emotion information is generated on the basis of the situation explanation information. When the extracted data does not include situation explanation information, second metadata corresponding to second emotion information generated on the basis of semantic analysis and context analysis is generated. One of the first metadata and the second metadata is added to the speech synthesis target text to synthesize speech corresponding to the extracted data. A speech synthesis apparatus of this disclosure may be associated with an artificial intelligence module, drone (unmanned aerial vehicle, UAV), robot, augmented reality (AR) devices, virtual reality (VR) devices, devices related to 5G services, and the like.

20 Claims, 17 Drawing Sheets

(51) Int. Cl.
  *G10L 25/63*  (2013.01)
  *G06F 17/16* (2006.01)
  *G10L 15/30* (2013.01)
  *G10L 25/30* (2013.01)

(56) References Cited

OTHER PUBLICATIONS

M. G. Reddy, D. M. Harikrishna, K. S. Rao and K. E. Manjunath, "Telugu emotional story speech synthesis using SABLE markup language," 2015 International Conference on Signal Processing and Communication Engineering Systems, Guntur, India, 2015, pp. 331-335. (Year: 2015).*

K. Matsumoto, S. Hara and M. Abe, "Speech-like Emotional Sound Generator by WaveNet," 2019 Asia-Pacific Signal and Information Processing Association Annual Summit and Conference (APSIPA ASC), Lanzhou, China, 2019, pp. 143-147. (Year: 2019).*

K. Inoue, S. Hara, M. Abe, N. Hojo and Y. Ijima, "An investigation to transplant emotional expressions in DNN-based TTS synthesis," 2017 Asia-Pacific Signal and Information Processing Association Annual Summit and Conference (APSIPA ASC), Kuala Lumpur, Malaysia, 2017, pp. 1253-1258. (Year: 2017).*

\* cited by examiner

FIG. 12

Script 1: Jung Haein (in 1970s feelings)
Nothing can stop our love.

| Neutral | Love | Happy | Anger | Sad |
|---|---|---|---|---|
| 0.3 | 0.5 | 0.2 | 0 | 0 |

Script 2: Kim Jooyoung (in a firm tone)
You should definitely believe me, mother.

| Neutral | Love | Happy | Anger | Sad |
|---|---|---|---|---|
| 0.5 | 0 | 0 | 0.5 | 0 |

FIG. 14A

I love you —— M1

FIG. 14B

| Neutral (EA1) | Love (EA2) | Happy (EA3) | Anger (EA4) | Sad (EA5) |
|---|---|---|---|---|
| 0.0 | 0.9 | 0.1 | 0.0 | 0.0 |

Emotion Vector

FIG. 15A

"Where are you?"

| Neutral | Love | Happy | Anger | Sad |
|---------|------|-------|-------|-----|
| 1.0 | 0.0 | 0.0 | 0.0 | 0.0 |

FIG. 15B

"Where are you? ^^"

| Neutral | Love | Happy | Anger | Sad |
|---------|------|-------|-------|-----|
| 0.0 | 0.6 | 0.4 | 0.0 | 0.0 |

FIG. 15C

"Where are you? ---;;"

| Neutral | Love | Happy | Anger | Sad |
|---------|------|-------|-------|-----|
| 0.0 | 0.0 | 0.0 | 0.8 | 0.2 |

FIG. 16A

Previous sentence: "I miss you"
Current sentence: "Where are you?"
                            |
                           M22

| Neutral | Love | Happy | Anger | Sad |
|---------|------|-------|-------|-----|
| 0.0     | 1.0  | 0.0   | 0.0   | 0.0 |

FIG. 16B

Previous sentence: "the appointed time has passed a long time ago."
Current sentence: "Where are you?"
                            |
                           M22

| Neutral | Love | Happy | Anger | Sad |
|---------|------|-------|-------|-----|
| 0.0     | 0.0  | 0.0   | 0.8   | 0.2 |

FIG. 17

Previous sentence: "I miss you"  
Current sentence: "Where are you?" — M3

$EV = W_s * EV_s + W_c * EV_c$ $EV = W_s *$ EVs $+ W_c *$ EVc

EV = 0.4 *

| Neutral | Love | Happy | Anger | Sad |
|---|---|---|---|---|
| 0.0 | 0.6 | 0.4 | 0.0 | 0.0 |

+ 0.6 *

| Neutral | Love | Happy | Anger | Sad |
|---|---|---|---|---|
| 0.0 | 1.0 | 0.0 | 0.0 | 0.0 |

EV =

| Neutral | Love | Happy | Anger | Sad |
|---|---|---|---|---|
| 0.0 | 0.84 | 0.16 | 0.0 | 0.0 |

– Transmitted emotion vector values [0, 0.84, 0.16, 0, 0]

SPEECH SYNTHESIS METHOD AND APPARATUS BASED ON EMOTION INFORMATION

CROSS-REFERENCE TO RELATED APPLICATION

This application claims the benefit of Korean Patent Application No. 10-2019-0103238, filed on Aug. 22, 2019, which is incorporated by reference for all purposes as if fully set forth herein.

BACKGROUND OF THE INVENTION

Field of the Invention

The present disclosure relates to a speech synthesis method and apparatus and, more specifically, to a speech synthesis apparatus and method for outputting speech having emotional contents.

Related Art

Conventional text-to-text (TTS) processing outputs text through pre-stored speech. Although primary objective of TTS processing is to deliver semantic contents of text, recent TTS processing is required to deliver interactive meaning of text as well as semantic contents of the text to a counterpart such that the intention or emotion of a user who has actually delivered the text is reflected in speech output and the counterpart can experience an interactive conversation with the text deliverer.

SUMMARY OF THE INVENTION

An object of the present disclosure is to solve the aforementioned necessity and/or problems.

Further, an object of the present disclosure is to realize speech synthesis containing emotions.

Further, an object of the present disclosure is to generate emotion information on the basis of situation explanation information of a scenario, a script or the like and combine generated emotions and text to realize speech synthesis for outputting lively speech.

Further, an object of the present disclosure is to realize speech synthesis containing emotions by analyzing semantic contents and context information of a scenario, a script or the like.

A speech synthesis method based on emotion information according to one aspect of the present disclosure includes: receiving data; extracting speech synthesis target text from the data; determining whether the data includes situation explanation information; generating first emotion information on the basis of situation explanation information when the data includes the situation explanation information and generating first metadata corresponding to the first emotion information; generating second emotion information on the basis of semantic analysis and context analysis of the data when the data does not include situation explanation information and generating second metadata corresponding to the second emotion information; and adding one of the first metadata and the second metadata to the speech synthesis target text to synthesize speech corresponding to the data.

In the method according to one aspect of the present disclosure, the situation explanation information may include at least one of the sex and age of a speaker, a time and atmosphere.

In the method according to one aspect of the present disclosure, the data may further include audio data recorded in a foreign language.

The method according to one aspect of the present disclosure may further include calculating an emotion vector on the basis of the audio data recorded in a foreign language, wherein the first metadata is generated on the basis of the first emotion information and the emotion vector.

In the method according to one aspect of the present disclosure, each piece of information included in the data may include an identifier for identifying the information.

In the method according to one aspect of the present disclosure, the first emotion information and the first metadata may be generated through DNN learning.

In the method according to one aspect of the present disclosure, the DNN learning may be performed using an emotion expression learning model, and the emotion expression learning model may be received from a cloud server.

In the method according to one aspect of the present disclosure, the first metadata and the second metadata may be described in the form of a markup language and the markup language may include a speech synthesis markup language (SSML).

In the method according to one aspect of the present disclosure, the SSML may include an element indicating an emotion attribute, wherein the emotion attribute includes at least one of "neutral", "love", "happy", "anger", "sad", "worry" and "sorry".

In the method according to one aspect of the present disclosure, vector values corresponding to respective emotion attributes may be represented in a sequence form or a one-dimensional matrix form and transmitted to a speech synthesis engine.

In the method according to one aspect of the present disclosure, the generating of the second emotion information may include: calculating a first emotion vector on the basis of an emotion element included in the data from which an emotion can be inferred through semantic analysis of the data; calculating a second emotion vector on the basis of the entire context of the data through context analysis of the data; and summing up the first emotion vector given a first weight and the second emotion vector given a second weight.

In the method according to one aspect of the present disclosure, the first emotion vector may be defined as a normalized weight sum applied to a plurality of emotion attributes, and the second emotion vector may be defined as a normalized weight sum applied to the plurality of emotion attributes.

In the method according to one aspect of the present disclosure, weights applied to the plurality of emotion attributes constituting the first emotion vector may be applied in consideration of symbols or graphical objects included in the data as a result of reasoning of semantic contents included in the data.

In the method according to one aspect of the present disclosure, weights applied to the plurality of emotion attributes constituting the second emotion vector may be applied in consideration of a context in sentences from which a context flow can be inferred.

The method according to one aspect of the present disclosure may further include receiving information about a voice preferred by a user, wherein user specific speech synthesis is performed on the basis of the information about the voice preferred by the user.

The method according to one aspect of the present disclosure may further include: performing an initial access procedure along with a user equipment (UE) by periodically transmitting a synchronization signal block (SSB); performing a random access procedure along with the UE; and transmitting an uplink grant to the UE for scheduling of transmission of the data.

The performing of the random access procedure may include: receiving a PRACH preamble from the UE; and transmitting a response to the PRACH preamble to the UE.

The method may further include performing a downlink beam management (DL BM) procedure using the SSB.

The performing of the DL BM procedure may include: transmitting CSI-ResourceConfig IE including CSI-SSB-ResourceSetList to the UE; transmitting a signal on SSB resources to the UE; and receiving a best SSBRI and a RSRP corresponding to the best SSBRI from the UE.

The speech synthesis method may further include: transmitting configuration information of a reference signal related to beam failure detection to the UE; and receiving a PRACH preamble for requesting beam failure recovery from the UE.

A speech synthesis apparatus based on emotion information according to another aspect of the present disclosure includes: a memory for storing data; a speech synthesizer for synthesizing speech corresponding to the data; and a processor for controlling the speech synthesizer such that the speech synthesizer performs a speech synthesis operation based on emotion information on the basis of whether the received data includes situation explanation information, wherein the processor is configured: to extract speech synthesis target text from the data and transmit the speech synthesis target text to the speech synthesizer; to generate first emotion information on the basis of situation explanation information when the data includes the situation explanation information, generate first metadata corresponding to the first emotion information and transmit the first metadata to the speech synthesizer; and to generate second emotion information on the basis of at least one of an emotion element from which an emotion included in the data can be inferred and the context of the data when the data does not include situation explanation information, generate second metadata corresponding to the second emotion information and transmit the second metadata to the speech synthesizer, wherein the speech synthesizer adds one of the first metadata and the second metadata to the speech synthesis target text to synthesize speech corresponding to the data.

The speech synthesis method and speech synthesis apparatus based on emotion information according to the present disclosure have the following advantages.

The present disclosure can realize speech synthesis containing emotion.

Further, the present disclosure can realize speech synthesis for outputting speech having an emotion suitable for a situation on the basis of situation explanation information included in a scenario, a script or the like.

Further, the present disclosure can output a message containing an emotion in each sentence by analyzing semantic contents and context information of a scenario, a script or the like.

The additional range of applicability of the present disclosure will become apparent through the detailed description below. However, since those skilled in the art will appreciate that various alterations and modifications are possible without departing from the scope of the present disclosure, embodiments disclosed herein are exemplary only and not to be considered as a limitation of the disclosure.

BRIEF DESCRIPTION OF THE DRAWINGS

FIG. 12 is a diagram for explaining an emotion vector according to an embodiment of the present disclosure.

FIGS. 14A and 14B are diagrams for explaining an emotion vector according to an embodiment of the present disclosure.

FIGS. 15A to 15C illustrate an example in which a semantic analysis module analyzes semantics of text (data) to calculate a first emotion vector according to an embodiment of the present disclosure.

FIGS. 16A and 16B illustrate an example in which a context analysis module analyzes the context of text (data) to calculate a second emotion vector according to an embodiment of the present disclosure.

FIG. 17 illustrates an example of generating final emotion information on the basis of a first emotion vector and a second emotion vector when received data does not include situation explanation information according to an embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted.

The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
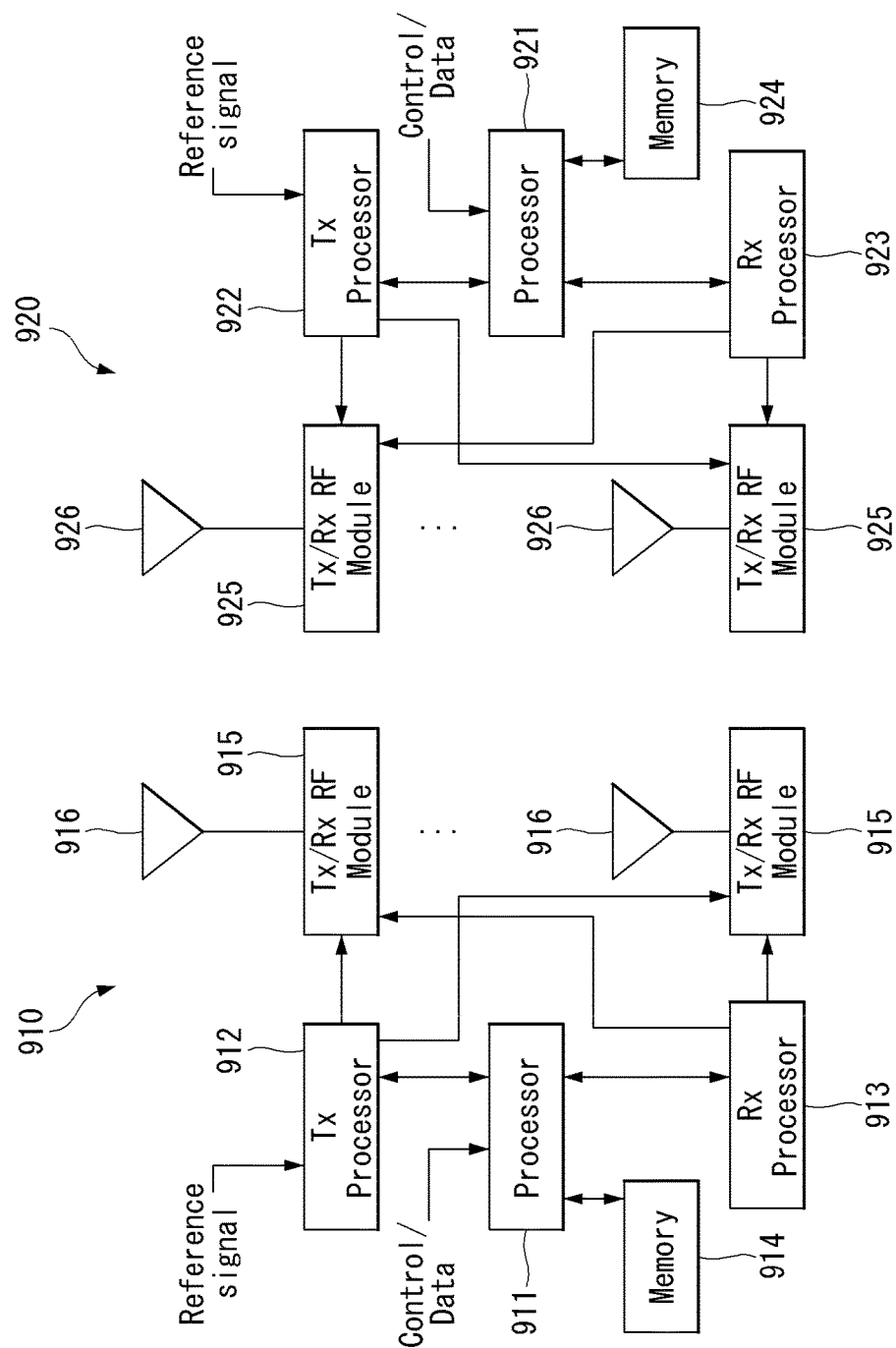
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
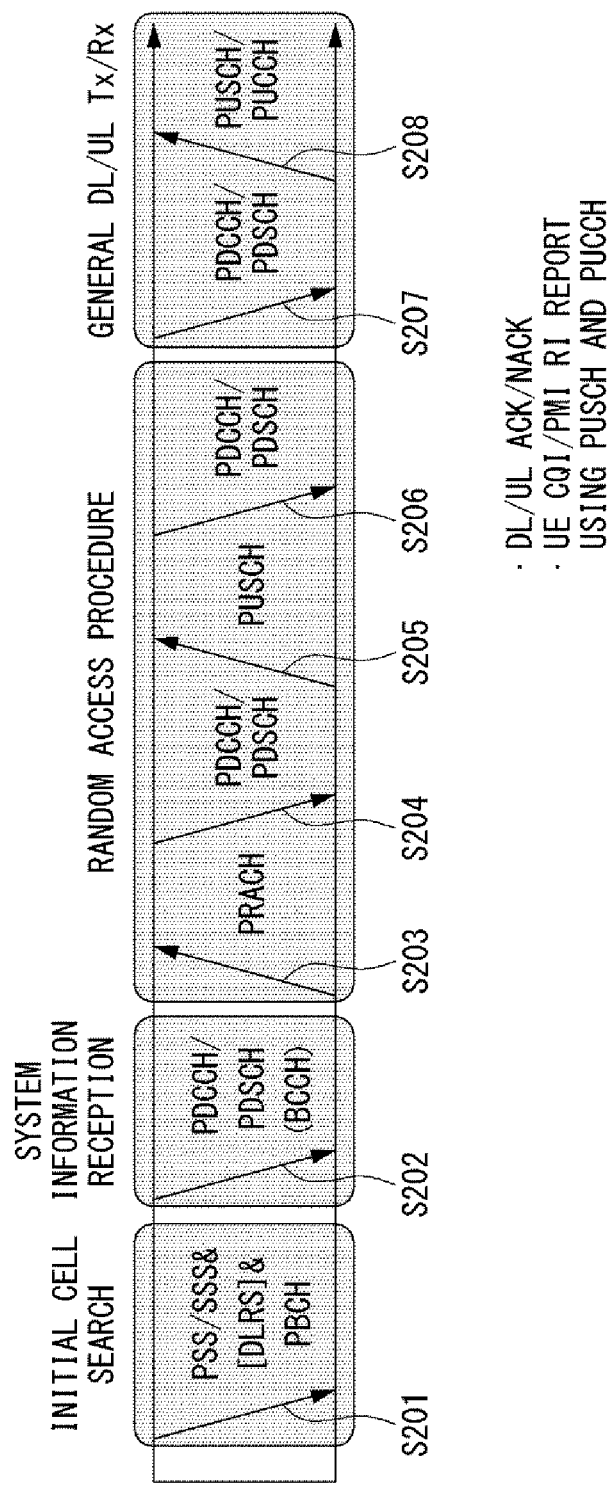
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.
  The UE repeatedly receives signals on resources in a CSI-RS resource set in which the RRC parameter 'repetition' is set to 'ON' in different OFDM symbols through the same Tx beam (or DL spatial domain transmission filters) of the BS.
  The UE determines an RX beam thereof.
  The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
  The UE receives signals on resources in a CSI-RS resource set in which the RRC parameter 'repetition' is set to 'OFF' in different DL spatial domain transmission filters of the BS.
  The UE selects (or determines) a best beam.
  The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
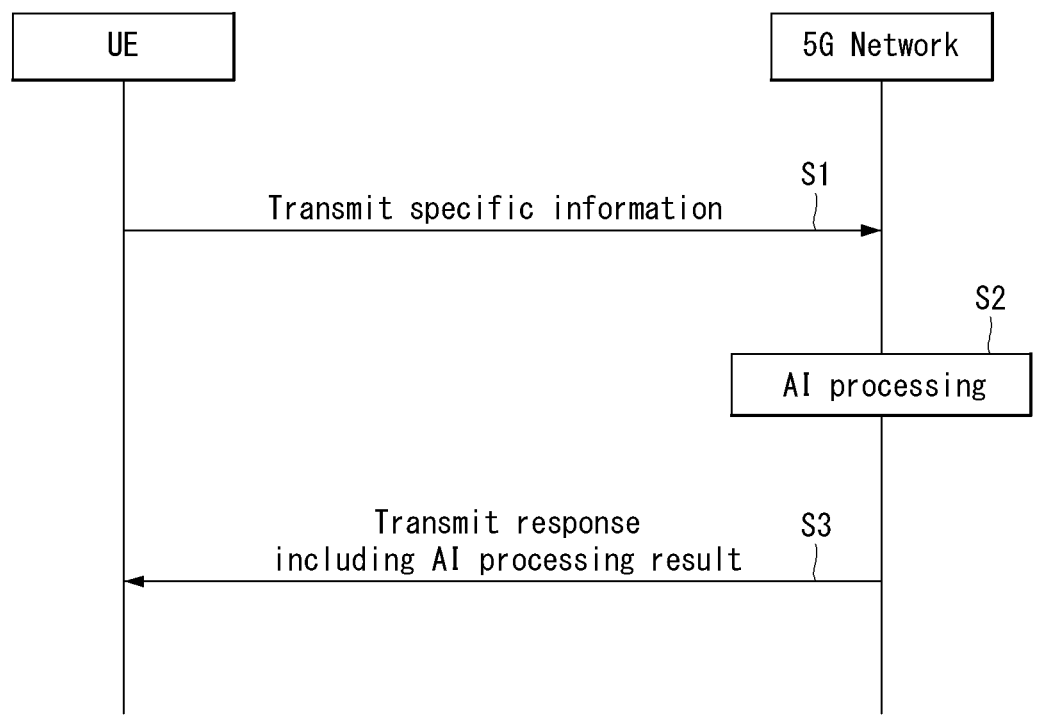
FIG. 3 shows an example of basic operations of AI processing in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
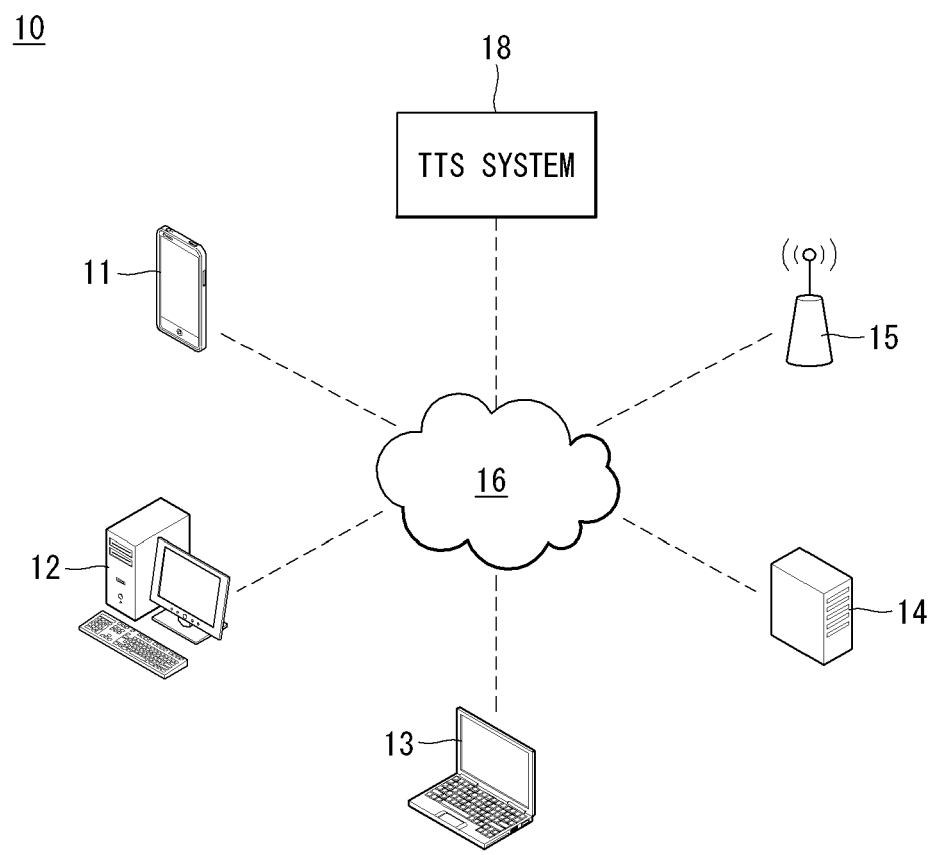
FIG. 4 illustrates a block diagram of a schematic system in which a speech synthesis method is implemented according to an embodiment of the present invention.

FIG. 4 illustrates a block diagram of a schematic system in which a speech synthesis method is implemented according to an embodiment of the present invention.

Referring to FIG. 4, a system for implementing a speech synthesis method according to an embodiment of the present invention may include a text-to-to-speech device as a speech synthesis apparatus 10, a network system 16, and a speech synthesis engine. Speech system 18 may be included.

The at least one speech synthesizing apparatus 10 may include a mobile phone 11, a PC 12, a notebook computer 13, and other server devices 14. The PC 12 and notebook computer 13 may be connected to at least one network system 16 via a wireless access point 15. According to an embodiment of the present invention, the speech synthesis apparatus 10 may include an audio book and a smart speaker.

Meanwhile, the TTS system 18 may be implemented in a server included in a network, or may be implemented by on-device processing and embedded in the speech synthesis apparatus 10. In the exemplary embodiment of the present invention, the TTS system 18 will be described on the premise that the TTS system 18 is implemented in the speech synthesis apparatus 10.

Figure 5:
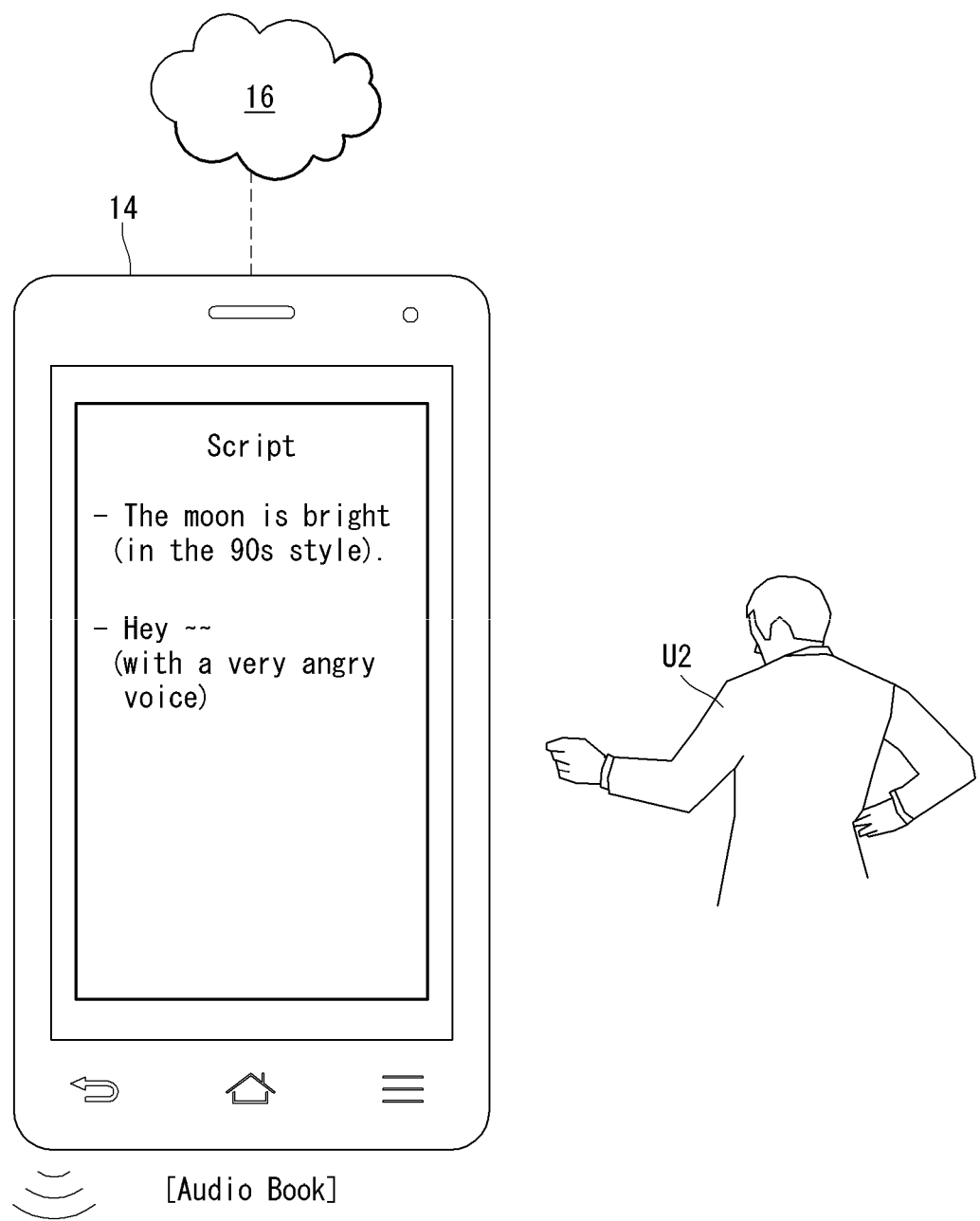
FIG. 5 is a diagram for explaining the concept in which a speech synthesis method according to an embodiment of the present disclosure is implemented.

FIG. 5 is a diagram for explaining the concept in which a speech synthesis method according to an embodiment of the present disclosure is implemented.

Referring to FIG. 5, a speech synthesis apparatus according to an embodiment of the present disclosure may be an audio book 14. The audio book 14 can store text data. The text data is referred to as a script in this specification. The audio book may store the script in a memory. Alternatively, the audio book may receive the script from a network system 16. The audio book can determine whether the script includes situation explanation information and generate emotion information according to a determination result. Further, the audio book may receive emotion information related to situation explanation information from the network system through a wireless communication unit in order to generate emotion information. The audio book 14 may add the emotion information to the script to synthesize speech with various emotions and styles and output the same to a user U2. Here, the audio book 14 may synthesize speech corresponding to the script on the basis of the emotion related information received from the network system 16 and output the speech.

Further, the audio book 14 may receive a speech synthesis form preferred by a user. In this case, the audio book 14 can select one of various forms that can be expressed for one emotion on the basis of user preference and use the selected form for speech synthesis. Accordingly, a user specific speech synthesis result can be provided.

Figure 6:
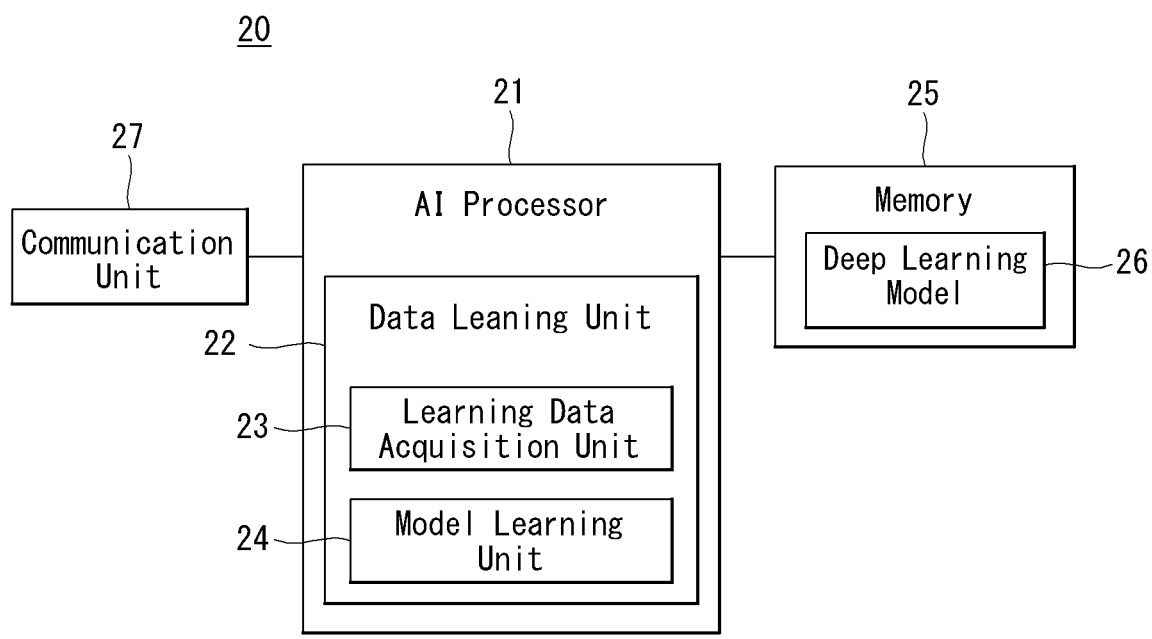
FIG. 6 is a block diagram of an Artificial Intelligence (AI) device implementable that can apply to an embodiment of the present invention.

FIG. 6 is a block diagram of an Artificial Intelligence (AI) device implementable that can apply to an embodiment of the present invention.

The AI device 20 may include an electronic device including an AI module capable of performing AI processing or a server including the AI module. In addition, the AI device 20 may be provided as an element of at least a part of the TTS device 10 shown in FIG. 4 and configured to perform at least a part of the AI processing.

The AI processing may include all operations related to speech synthesis performed by the TTS device 10 shown in FIG. 4. For example, the AI processing may be a process of analyzing a script of the TTS device 10 to set the most suitable speakers respectively corresponding to multiple characters present in the script. The AI processing may analyze the multiple characters present in the script and provide character characteristics to a user. The user may select the most suitable speaker for each character included in consideration of character characteristics according to a result of the AI processing.

The AI device 20 may include an AI processor 21, a memory 25 and/or a communication unit 27.

The AI device 20 is a computing device capable of training a neural network and may be implemented as any of various electronic devices such as a server, a desktop PC, a laptop PC, a tablet PC, etc.

The AI processor 21 may train a neural network using a program stored in the memory 25.

In particular, the AI processor 21 may analyze a script and train a neural network for recognizing the best suitable speakers for characters present in the script. Here, the neural network for recognizing the best suitable speaker may be designed to simulate a human brain structure in a computer and may include a plurality of weighted network nodes that simulate neurons of a human neural network.

The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Here, in a case where the AI processor 21 is included in a network system, the external electronic device may be a text-to-speech (TTS) device according to an embodiment of the present invention.

Meanwhile, the AI device 20 shown in FIG. 5 is described by functionally classifying into the AI processor 21, the memory 25, the communication unit 27, etc., yet these constituent components can be integrated as one module and referred to as an AI module.

Figure 7:
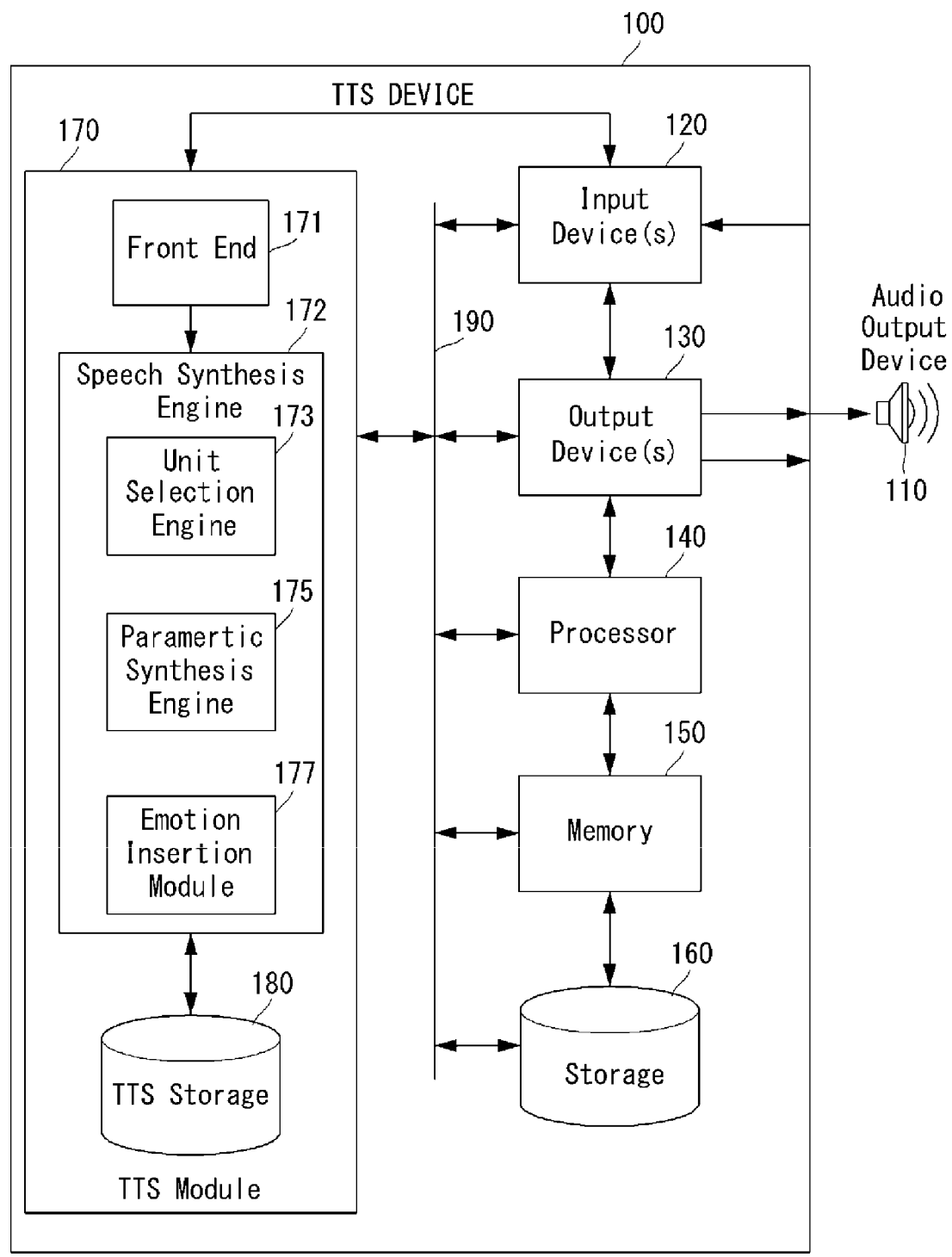
FIG. 7 is an exemplary block diagram of a text-to-speech (TTS) device according to an embodiment of the present invention.

FIG. 7 is an exemplary block diagram of a text-to-speech (TTS) device according to an embodiment of the present invention.

A TTS device 100 shown in FIG. 7 may include an audio output device 110 for outputting a voice processed by the TTS device 100 or by a different device.

FIG. 7 discloses the TTS device 100 for performing speech synthesis. An embodiment of the present invention may include computer-readable and computer-executable instructions that can be included in the TTS device 100. Although FIG. 7 discloses a plurality of elements included in the TTS device 100, configurations not disclosed herein may be included in the TTS device 100.

Meanwhile, some configurations disclosed in the TTS device 100 may be single configurations and each of them may be used multiple times in one device. For example, the TTS device 100 may include a plurality of input devices 120, an output device 130 or a plurality of controllers/processors 140.

A plurality of TTS devices may be applied to one TTS device. In such a multiple device system, the TTS device may include different configurations to perform various aspects of speech synthesis. The TTS device shown in FIG. 7 is merely an exemplary, may be an independent device, and may be implemented as one configuration of a large-sized device or system.

According to an embodiment of the present invention, a plurality of difference devices and a computer system may be, for example, applied to a universal computing system, a server-client computing system, a telephone computing system, a laptop computer, a mobile terminal, a PDA, and a tablet computer, etc. The TTS device 100 may be applied as a different device providing a speech recognition function, such as ATMs, kiosks, a Global Positioning System (GPS), a home appliance (e.g., a refrigerator, an oven, a washing machine, etc.), vehicles, ebook readers, etc. or may be applied as a configuration of the system.

Referring to FIG. 7, the TTS device 100 may include a speech output device 110 for outputting a speech processed by the TTS device 100 or by a different device. The speech output device 110 may include a speaker, a headphone, or a different appropriate configuration for transmitting a speech. The speech output device 110 may be integrated into the TTS device 100 or may be separated from the TTS device 100.

The TTS device 100 may include an address/data bus 224 for transmitting data to configurations of the TTS device 100. The respective configurations in the TTS device 100 may be directly connected to different configurations through the bus 224. Meanwhile, the respective configurations in the TTS device 100 may be directly connected to a TTS module 170.

The TTS device 100 may include a controller (processor) 140. A processor 208 may correspond to a CPU for processing data and a memory for storing computer-readable instructions to process data and storing the data and the instructions. The memory 150 may include a volatile RAM, a non-volatile ROM, or a different-type memory.

The TTS device 100 may include a storage 160 for storing data and instructions. The storage 160 may include a magnetic storage, an optical storage, a solid-state storage, etc.

The TTS device 100 may access a detachable or external memory (e.g., a separate memory card, a memory key drive, a network storage, etc.) through an input device 120 or an output device 130.

Computer instructions to be processed by the processor 140 to operate the TTS device 100 and various configurations may be executed by the processor 140 and may be stored in the memory 150, the storage 160, an external device, or a memory or storage included in the TTS module 170 described in the following. Alternatively, all or some of executable instructions may be added to software and thus embedded in hardware or firmware. An embodiment of the present invention may be, for example, implemented as any of various combinations of software, firmware and/or hardware.

The TTs device 100 includes the input device 120 and the output device 130. For example, the input device a microphone, a touch input device, a keyboard, a mouse, a stylus, or the audio output device 100 such as a different input device. The output device 130 may include a visual display or tactile display, an audio speaker, a headphone, a printer, or any other output device. The input device 120 and/or the output device 130 may include an interface for connection with an external peripheral device, such as a Universal Serial Bus (USB), FireWire, Thunderbolt, or a different access protocol. The input device 120 and/or the output device 130 may include a network access such as an Ethernet port, a modem, etc. The input device 120 and/or the output device may include a wireless communication device such as radio frequency (RF), infrared rays, Bluetooth, wireless local area network (WLAN) (e.g., WiFi and the like) or may include a wireless network device such as a 5G network, a long term evolution (LTE) network, a WiMAN network, and a 3G network. The TTS device 100 may include the Internet or a distributed computing environment through the input device 120 and/or the output device 130.

The TTS device 100 may include the TTS module 170 for processing textual data into audio waveforms including speeches.

The TTS module 170 may access to the bus 224, the input device 120, the output device 130, the audio output device 110, the processor 140, and/or a different configuration of the TTS device 100.

The textual data may be generated by an internal configuration of the TTS device 100. In addition, the textual data may be received from an input device such as a keyboard or may be transmitted to the TTS device 100 through a network access. A text may be a type of a sentence including a text, a number and/or a punctuation to convert into a speech by the TTS module 170. An input text may include a special annotation for processing by the TTS module 170 and may use the special annotation to indicate how a specific text is to be pronounced. The textual data may be processed in real time or may be stored or processed later on.

The TTS module 170 may include a front end 171, a speech synthesis engine 172, and a TTS storage 180. The front end 171 may convert input textual data into symbolic linguistic representation for processing by the speech synthesis engine 172. The speech synthesis engine 172 may convert input text into a speech by comparing annotated phonetic unit models and information stored in the TTS storage 180. The front end 171 and the speech synthesis engine 172 may include an embedded internal processor or memory, or may use a processor 140 included in the TTS device 100 or a memory. Instructions for operating the front end 171 and the speech synthesis engine 172 may be included in the TTS module 170, the memory 150 of the TTS device 100, the storage 160, or an external device.

Input of a text into the TTS module 170 may be transmitted to the front end 171 for a processing. The front end 171 may include a module for performing text normalization, linguistic analysis, and linguistic prosody generation.

While performing the text normalization, the front end 171 may process a text input and generate a standard text to thereby convert numbers, abbreviations, and symbols identically.

While performing the linguistic analysis, the front end 171 may generate language of a normalized text to generate a series of phonetic units corresponding to an input text. This process may be referred to as phonetic transcription. The phonetic units include symbol representation of sound units that are lastly coupled and output by the TTS device 100 as a speech. Various sound units may be used to divide a text for speech synthesis. The TTS module 170 may process a speech based on phonemes (individual acoustics), half-phonemes, di-phones (the last half of a phoneme coupled to a half of a neighboring phoneme), bi-phones (two continuous phones), syllables, words, phrases, sentences, or other units. Each word may be mapped to one or more phonetic units. Such mapping may be performed using a language dictionary stored in the TTS device 100.

Linguistic analysis performed by the front end 171 may include a process of identifying different syntactic elements, such as prefixes, suffixes, phrases, punctuations, and syntactic boundaries. Such syntactic elements may be used to output a natural audio waveform by the TTS module 170. The language dictionary may include letter-to-sound rules and other tools for pronouncing a previously unidentified word or letter combination that can be made by the TTS module 170. In general, the more the information is included in the language dictionary, the higher the quality of speech output can be ensured.

Based on the linguistic analysis, the front end 171 may generate linguistic prosody of which annotation is processed to prosodic characteristics so that phonetic units represent how final acoustic units has to be pronounced in a final output speech.

The prosodic characteristics may be referred to as acoustic features. While an operation of this step is performed, the front end 171 may integrate the acoustic features into the TTS module 170 in consideration of random prosodic annotations that accompanies a text input. Such acoustic features may include pitch, energy, duration, etc. Application of the acoustic features may be based on prosodic models that can be used by the TTS module 170. Such prosodic models represent how phonetic units are to be pronounced in a specific situation. For example, the prosodic models may take into consideration of a phoneme's position in a syllable, a syllable's position in a word, a word's position in a sentence or phrase, neighboring phonetic units, etc. Likewise to the language dictionary, the more information on prosodic models exists, the higher the quality of speech output is ensured.

An output from the front end 171 may include a series of phonetic units which are annotation-processed into prosodic characteristics. The output from the front end 171 may be referred to as symbolic linguistic representation. The symbolic linguistic representation may be transmitted to the speech synthesis engine 172. The speech synthetic engine 172 may convert the speech into an audio wave so as to output the speech to a user through the audio output device 110. The speech synthesis engine 172 is configured to convert an input test into a high-quality natural speech in an efficient way. Such a high-quality speech may be configured to be pronounced in a similar way of a human speaker as much as possible.

The speech synthesis engine 172 may perform synthesis using at least one or more other methods.

The unit selection engine 173 compares a recorded speech database with a symbolic linguistic representation generated by the front end 171. The unit selection engine 173 matches the symbol linguistic representation and a speech audio unit in the recorded speech database. In order to form a speech output, matching units may be selected and the selected matching units may be connected to each other. Each unit includes audio waveforms, which correspond to a phonetic unit such as a short WAV file of specific sound along with description of various acoustic features associated with the WAV file (pitch, energy, etc.), and also includes other information such as a position at which the phonetic unit is represented in a word, a sentence, a phrase, or a neighboring phonetic unit.

The unit selection engine 173 may match an input text using all information in a unit database in order to generate a natural waveform. The unit database may include examples of multiple speech units that provide different options to the TTS device 100 to connect the units to a speech. One of advantages of unit selection is that a natural speech output can be generated depending on a size of the database. In addition, the greater the unit database, the more natural the speech can be constructed by the TTS device 100.

Meanwhile, speech synthesis can be performed not just by the above-described unit selection synthesis, but also by parameter synthesis. In the parameter synthesis, synthesis parameters such as frequency, volume, and noise can be varied by a parameter synthesis engine 175, a digital signal processor, or a different audio generating device in order to generate artificial speech waveforms.

The parameter synthesis may match symbolic linguistic representation with a desired output speech parameter by using an acoustic model and various statistical techniques. In the parameter synthesis, a speech can be processed even without a large-capacity database related to unit selection and a processing can be performed at a high speed. The unit selection synthesis technique and the parameter synthesis technique may be performed individually or in combination to thereby generate a speech audio output.

The parameter speech synthesis may be performed as follows. The TTS module 170 may include an acoustic model that can transform symbolic linguistic representation into a synthetic acoustic waveform of a test input based on audio signal manipulation. The acoustic model may include rules that can be used by the parameter synthesis engine 175 to allocate specific audio waveform parameters to input phonetic units and/or prosodic annotations. The rules may be used to calculate a score indicating a probability that a specific audio output parameter (frequency, volume, etc.) may correspond to input symbolic linguistic representation from the pre-processor 171.

The parameter synthesis engine 175 may apply multiple techniques to match a speech to be synthesized with an input speech unit and/or a prosodic annotation. One of general techniques employs Hidden Markov Model (HMM). The HMM may be used to determine a probability for an audio output to match a text input. In order to artificially synthesize a desired speech, the HMM may be used to convert linguistic and acoustic space parameters into parameters to be used by a vocoder (digital voice encoder).

The TTS device 100 may include a speech unit database to be used for unit selection.

The speech unit database may be stored in the TTS storage 180, the storage 160, or another storage configuration. The speech unit database may include a recorded speech voice. The speech voice may be a text corresponding to utterance contents. In addition, the speech unit database may include a recorded speech (in the form of an audio waveform, a feature factor, or another format) occupying a considerable storage space in the TTS device 100. Unit samples in the speech unit database may be classified in various ways including a phonetic unit (a phoneme, a diphone, a word, and the like), a linguistic prosody label, an acoustic feature sequence, a speaker identity, and the like.

When matching symbolic linguistic representation, the speech synthesis engine 172 may select a unit in the speech unit database that most closely matches an input text (including both a phonetic unit and a prosodic symbol annotation). In general, the large the capacity of the speech unit database, the more the selectable unit samples and thus the more accurate the speech output.

Audio waveforms including a speech output to a user may be transmitted to the audio output device 110 from the TTS module 213 so that the audio waveforms are output to a user. Audio waveforms including a speech may be stored in multiple different formats such as feature vectors, non-compressed audio data, or compressed audio data. For example, an audio output may be encoded and/or compressed by an encoder/decoder before the transmission. The encoder/decoder may encode or decode audio data such as digitalized audio data, feature vectors, etc. In addition, the function of the encoder/decoder may be included in an additional component or may be performed by the processor 140 and the TTS module 170.

Meanwhile, the TTS storage 180 may store different types of information for speech recognition.

Contents in the TTS storage 180 may be prepared for general TTS usage and may be customized to include sound and words that can be used in a specific application. For example, for TTS processing by a GPS device, the TTS storage 180 may include a customized speech specialized in position and navigation.

In addition, the TTS storage 180 may be customized to a user based on a personalized desired speech output. For example, the user may prefer an output voice of a specific gender, a specific accent, a specific speed, a specific emotion (e.g., a happy voice). The speech synthesis engine 172 may include a specialized database or model to explain such user preference.

The TTs device 100 may perform TTS processing in multiple languages. For each language, the TTS module 170 may include data, instructions, and/or components specially configured to synthesize a speech in a desired language.

For performance improvement, the TTS module 213 may modify or update contents of the TTS storage 180 based on a feedback on a TTS processing result, and thus, the TTS module 170 may improve speech recognition beyond a capability provided by a training corpus.

As the processing capability of the TTS device 100 improves, a speech output is possible by reflecting an attribute of an input text. Alternatively, although an emotion attribute is not included in the input text, the TTS device 100 may output a speech by reflecting intent (emotion classification information) of a user who has written the input text.

Indeed, when a model to be integrated into a TTS module for performing TTS processing is established, the TTS system may integrate the above-described various configurations and other configurations. For example, the TTS device 100 may insert an emotion element into a speech.

In order to output the speech added with the emotion classification information, the TTS device 100 may include an emotion insertion module 177. The emotion insertion module 177 may be integrated into the TTS module 170 or integrated as a part of the pre-processor 171 or the speech synthesis engine 172. The emotion insertion module 177 may realize emotion classification information-based TTS using metadata that corresponds to an emotion attribute. According to an embodiment of the present invention, the metadata may be in markup language and preferably in speech synthesis markup language (SSML). A method of performing emotion classification information-based TTS using SSML will be hereinafter described in detail.

In fact, when a model to be integrated into a TTS module for performing a TTS processing is established, the TTS system may integrate another constituent component with the aforementioned various constituent components. For example, the TTS device 100 may include a block for setting a speaker.

A speaker setting unit 177 may set an individual speaker for each character included in a script. The speaker setting unit 177 may be integrated into a TTS module 170 or may be integrated as a part of a pre-processor 171 or a speech synthesis engine 172. The speaker setting unit 177 synthesizes texts corresponding to multiple characters with a voice of a set speaker using metadata corresponding to a speaker profile.

According to an embodiment of the present invention, the metadata may use markup language and may preferably use speech synthesis markup language (SSML).

Figure 8:
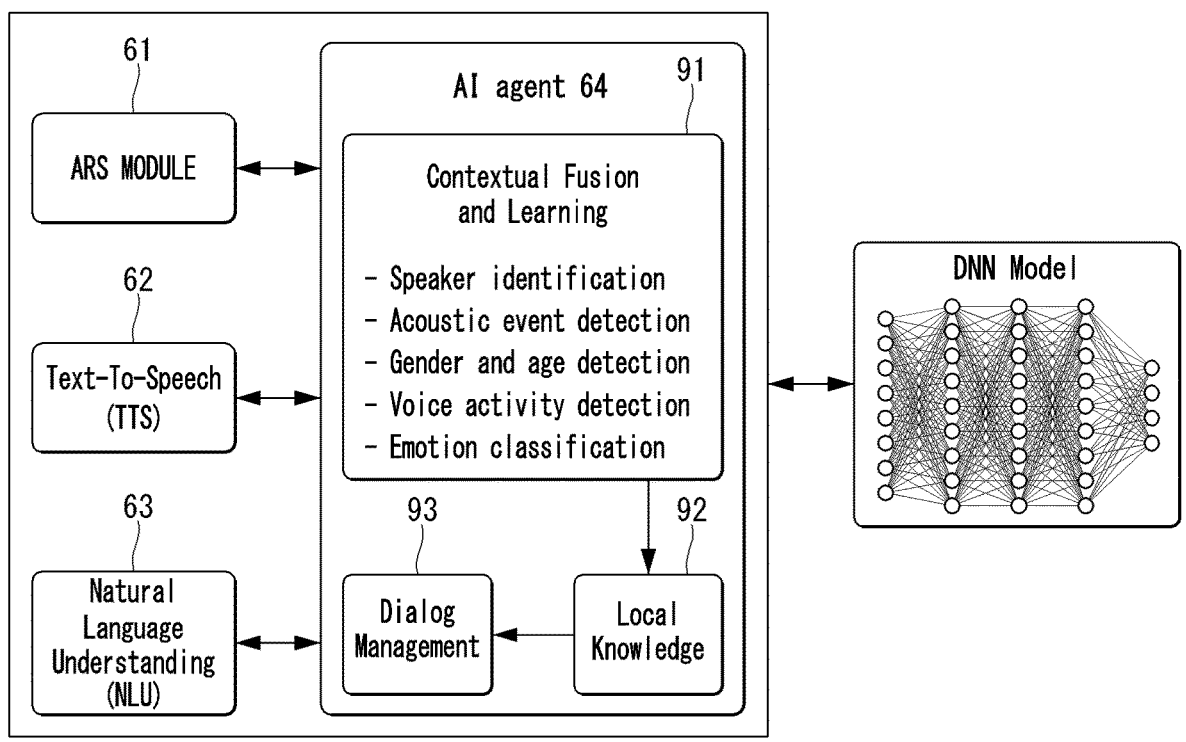
FIG. 8 is a schematic block diagram of an AI agent capable of performing emotion classification information-based TTS according to an embodiment of the present invention.

FIG. 8 is a schematic block diagram of an AI agent capable of performing emotion classification information-based TTS according to an embodiment of the present invention.

Referring to FIG. 8, in the speech processing procedure described with reference to FIGS. 4 and 5, the AI agent 74 may support an interactive operation with a user, in addition to an ASR operation, an NLU operation, and a TTS operation. Alternatively, using context information, the AI agent 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent 74 may further include a context fusion and learning module 91, a local knowledge 92, and a dialogue management 93.

The context fusion and learning module 91 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The contest fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be acquired through the above-described DNN model.

The AI agent 74 may include the local knowledge 92. The local knowledge 92 may include user data. The user data may include a user's preference, the user's address, the user's initially set language, the user's contact list, etc. According to an embodiment, the AI agent 74 may additionally define the user's intent by complementing information included in the user's speech input using the user's specific information. For example, in response to the user's request "Invite my friends to my birthday party", the AI agent 74 does not request more clarified information from the user and may utilize the local knowledge 92 to determine who "the friends" are and when and where the "birthday" takes place.

The AI agent 74 may further include the dialogue management 93. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

Figure 9:
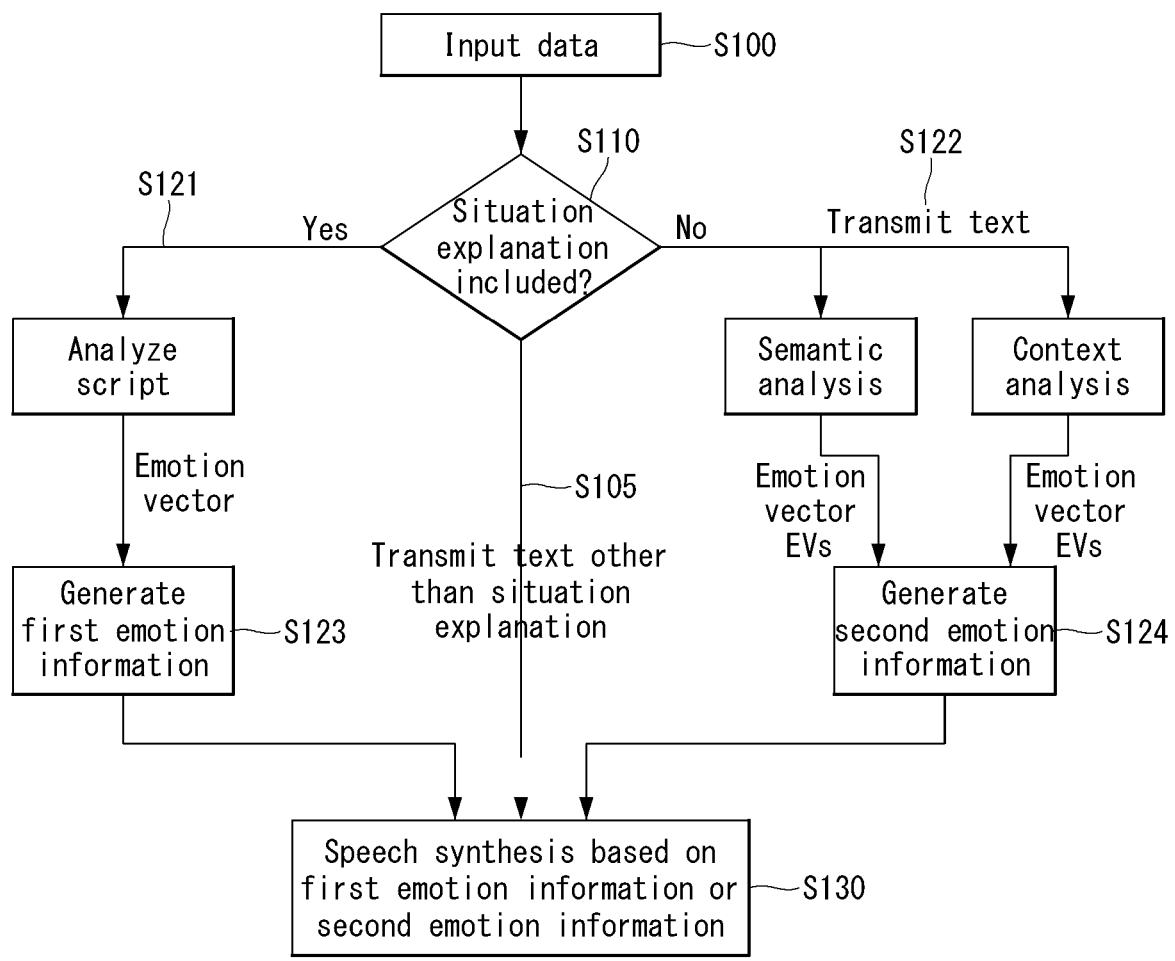
FIG. 9 is a flowchart of a speech synthesis method based on emotion setting through script analysis according to an embodiment of the present disclosure.

FIG. 9 is a flowchart of a speech synthesis method based on emotion setting through script analysis according to an embodiment of the present disclosure.

The speech synthesis method based on emotion setting through script analysis according to an embodiment of the present disclosure can be implemented in the TTS device described with reference to FIGS. 1 to 8. Hereinafter, the speech synthesis method based on emotion setting through script analysis and an operation of a speech synthesis apparatus for implementing the same according to an embodiment of the present disclosure will be described in detail with reference to the drawings.

Referring to FIG. 9, the speech synthesis apparatus 100 or 200 may receive data (e.g., a script, a scenario, a document or the like) (S100). For example, the data may correspond to a script of multimedia content such as a movie, a drama, animation or a TV program. Furthermore, the data may further include audio data. For example, the data may include speech data (e.g., movie dubbing) recorded in a foreign language along with a movie scenario.

Further, the data may include text that is a speech synthesis target, text that is not a speech synthesis target but includes information necessary for speech synthesis, audio data and video data. In this case, the data may include an identifier (e.g., a marker, a data ID, a label, or the like) by which each piece of data can be identified.

For example, the speech synthesis apparatus 100 or 200 may receive the data through a wireless communication system (e.g., LTE-A/NR). Alternatively, the speech synthesis apparatus may receive the data from an external device through one or more interfaces (e.g., a USB, WiFi, Bluetooth and the like) included in the apparatus. The received data may be stored in a memory of the speech synthesis apparatus. Alternatively, the received data may be stored in an external device (e.g., a cloud device, a server, or the like) of the speech synthesis apparatus.

The speech synthesis apparatus 100 or 200 may determine whether the received data include situation explanation information (S110). The situation explanation information may include information such as the sex and the age of a speaker, a time, a situation, characters, nuance and atmosphere. The situation explanation information can be used to generate emotion information of the script to be used for speech synthesis. In this case, the situation explanation information can be identified on the basis of an identifier (e.g., a marker, a data ID, a label, or the like) for identifying each piece of data.

The speech synthesis apparatus 100 or 200 may extract speech synthesis target text from the received data and transmit the speech synthesis target text to a speech synthesis engine (S105). Here, the speech synthesis apparatus can transmit only data to be used to actually synthesize speech other than a situation explanation part among the entire data. In this case, the speech synthesis target text can be identified on the basis of an identifier (e.g., a marker, a data ID, a label or the like) for identifying each piece of data.

When the data includes situation explanation information (S110: YES), the speech synthesis apparatus 100 or 200 can transmit the data to a script analysis module for extracting emotion information from the situation explanation information (S121).

The script analysis module can generate first emotion information on the basis of the situation explanation information (S123) and transmit the first emotion information to the speech synthesis engine. In other words, the script analysis module can generate first metadata corresponding to the first emotion information and transmit the first metadata to the speech synthesis engine.

For example, the first emotion information and the first metadata may be generated through neural network learning (e.g., DNN learning). DNN learning may be performed using an emotional expression learning model, and the emotional expression learning model may be received through a cloud server. Alternatively, DNN learning may be carried out in a cloud and results of DNN learning may be received from the cloud server.

In addition, when the data further includes audio data recorded in a foreign language, an emotion vector may be calculated on the basis of the audio data and the first metadata may be generated on the basis of the first emotion information and the emotion vector based on the audio data.

The process of generating the first emotion information and the first metadata on the basis of the situation explanation information will be described in detail later with reference to FIGS. 10 to 12.

On the other hand, when the data does not include situation explanation information (S110: NO), the speech synthesis apparatus 100 or 200 can generate second emotion information from the received data through a reasoning process. To this end, the speech synthesis apparatus 100 or 200 can transmit the received data to a semantic analysis module and a context analysis module (S122).

The second emotion information can be generated on the basis of a first emotion vector generated through semantic analysis and a second emotion vector generated through context analysis (S124). In other words, second metadata corresponding to the second emotion information can be generated and transmitted to the speech synthesis engine.

The process of generating the second emotion information through semantic analysis and context analysis will be described in detail later with reference to FIGS. 13 to 17.

The speech synthesis engine can perform speech synthesis on the basis of at least one of the first emotion information and the second emotion information (S130). That is, the speech synthesis engine can add one of the first metadata and the second metadata to the speech synthesis target data to synthesize speech corresponding to the data.

Further, the speech synthesis apparatus 100 or 200 may further receive information about a voice preferred by a user from the user. In this case, the speech synthesis apparatus may perform user specific speech synthesis on the basis of the information about the voice preferred by the user when performing speech synthesis.

Here, the speech synthesis engine may be the TTS module 170 or the speech synthesis engine 172 included in the TTS module 170 described in FIG. 7. Alternatively, the speech synthesis engine may correspond to the TTS module 62 described in FIG. 8. The speech synthesis engine can add the first emotion information or the second emotion information to the speech corresponding to the received speech synthesis target text and output the speech.

The emotion information (e.g., the first emotion information and the second emotion information) may be classified as and set to at least one of emotion attributes of "neutral", "love", "happy", "anger", "sad", "worry" and "sorry".

The first emotion information is emotion information generated from the situation explanation information included in the data. The second emotion information can be defined as emotion information newly generated by the speech synthesis apparatus 100 or 200 analyzing the received data when situation explanation information has not been set in the data.

The first emotion information and the second emotion information may be transmitted in a metadata format to the speech synthesis engine. The metadata is a markup language and may be a speech synthesis markup language (SSML). A representation described in the SSML format may include an element indicating the aforementioned emotion elements.

The first metadata corresponding to the first emotion information and the second metadata corresponding to the second emotion information may represent vector values corresponding to the aforementioned emotion attributes (e.g., "neutral", "love", "happy", "anger", "sad", "worry" and "sorry") in a sequence form or a one-dimensional matrix form, and a sequence or a one-dimensional matrix of the vector values can be transmitted to the speech synthesis engine.

The process through which the speech synthesis apparatus 100 or 200 performs a speech synthesis operation by generating the first emotion information on the basis of situation explanation information when received data includes the situation explanation information or generating the second emotion information through analysis of semantics and context of a sentence when the received data does not include situation explanation information has been described.

Hereinafter, the process of generating the first emotion information or the second emotion information will be described in more detail with reference to FIGS. 10 to 17.

Figure 10:
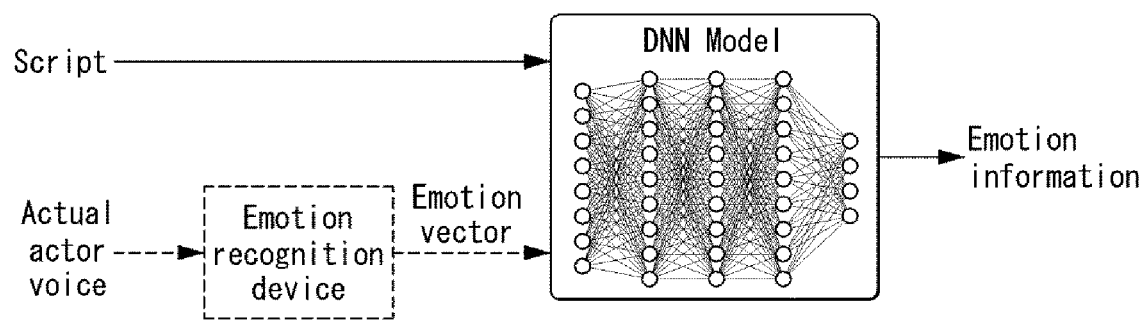
FIG. 10 illustrates an example of a configuration of a script analysis module.
Figure 11:
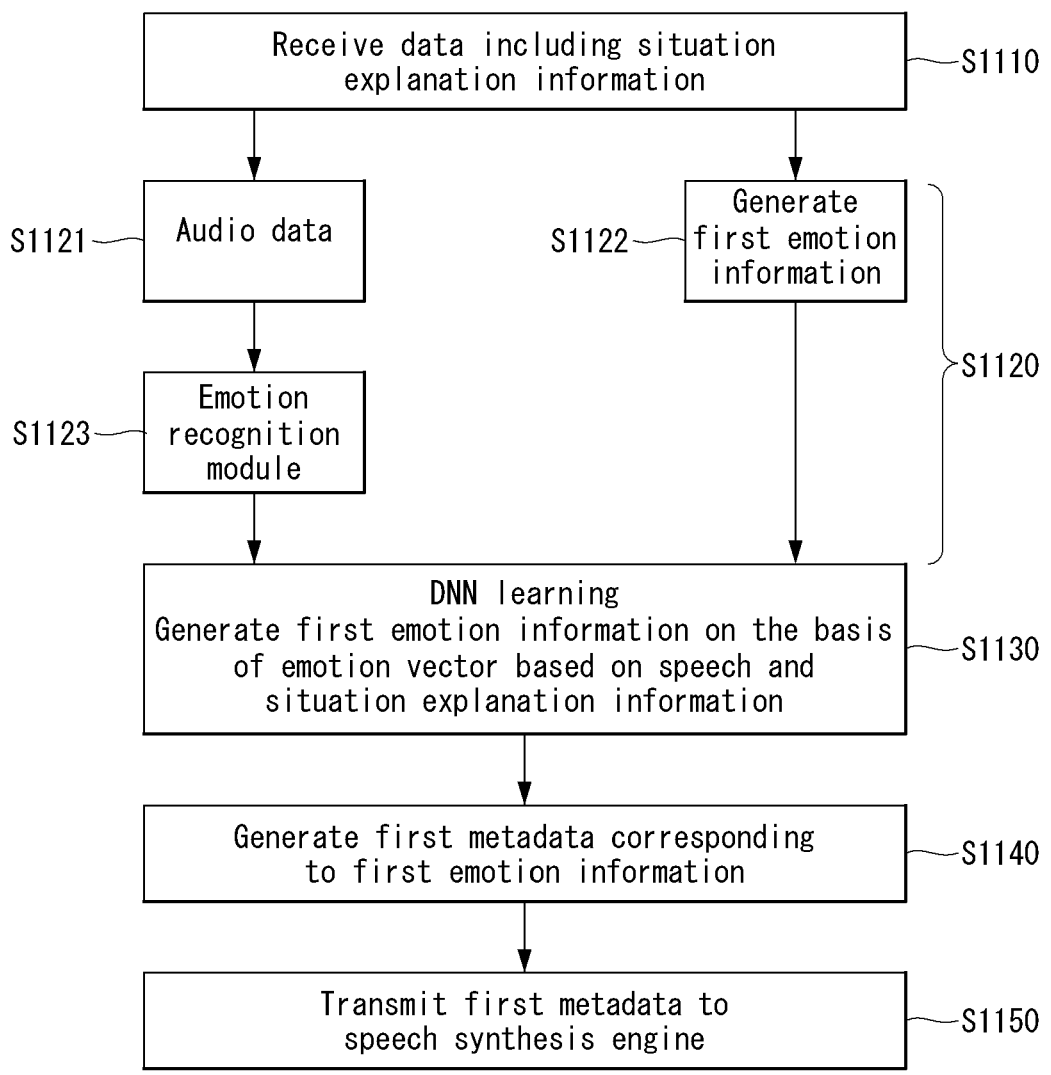
FIG. 11 illustrates an example of a flowchart of an operation of performing speech synthesis of a speech synthesis apparatus when data includes situation explanation information according to an embodiment of the present disclosure.

FIGS. 10 to 12 illustrate a specific example of generating the first emotion information to perform speech synthesis when data input to the speech synthesis apparatus 100 or 200 includes situation explanation information.

FIG. 10 illustrates an example of a configuration of the script analysis module. Referring to FIG. 10, when data (e.g., a script) includes situation explanation information, an emotion vector can be generated through DNN learning for situation explanation. A deep learning model used for learning with respect to emotion expression on the basis of situation explanation is referred to as a situation explanation emotion expression learning model for convenience of description. However, this is for convenience of description and does not limit the scope of the present disclosure.

Further, when the data includes a script and audio data (e.g., a movie script dubbed into a foreign language and an audio file recorded in a foreign language) from which emotions can be perceived, emotions can be inferred from audio information through a legacy emotion recognition device and a final emotion vector can be generated by performing DNN learning based on the inferred emotions and situation explanation included in the script.

For audio data, a speech input processing sequence can be carried out in such a manner that signal acquisition and playback, speech pre-processing, voice activation, speech recognition and natural language processing are sequentially performed, the result is transmitted to an emotion recognition device in which emotions are inferred through an artificial neural network, and a speech synthesis process through which a device responds to a user is finally performed.

For example, when an audio file of a movie dubbed into a foreign language is provided along with a script, emotion information can be extracted through analysis of situation explanation information included in the script and voices of actors. Here, a deep learning model may also be used.

In other words, an emotion vector derived through the emotion recognition device from actual speech of an actor reading a script can be input along with the script as an input layer of the situation explanation emotion expression learning model. Here, the emotion recognition device is a legacy emotion recognition device and can analyze input speech to calculate an emotion vector and generate an output value. For example, the emotion recognition device can include a noise suppression (NS) function for input speech to remove background noise included in an audio input file.

For example, the intelligent agent module 64 can distinguish speech data from non-speech data using a deep neural network (DNN) model. Further, the intelligent agent module 64 can perform emotion classification on situation explanation information and/or speech data using the DNN model. Speech data can be classified into "anger", "boredom", "fear", "happiness" and "sadness" according to the emotion classification.

FIG. 11 illustrates an example of a flowchart of a speech synthesis operation of the speech synthesis apparatus when data includes situation explanation information according to an embodiment of the present disclosure. FIG. 11 is for convenience of description and does not limit the scope of the present disclosure.

Referring to FIG. 11, the speech synthesis apparatus 100 or 200 may receive data including situation explanation information (S1110). Pre-processing before DNN learning may be performed according to information included in the input data (S1120). Specifically, the situation explanation information included in the input data can be extracted and transmitted a DNN learning module (S1122). When the input data includes audio data (S1121), the audio data may be transmitted to a legacy emotion module (S1123). The legacy emotion module can calculate an emotion vector through speech analysis of the audio data. The emotion vector calculated from the audio data can be used for DNN learning.

DNN learning may be performed using an emotion expression learning model on the basis of the situation explanation information and/or the emotion vector calculated through speech analysis (S1130).

For example, the intelligent agent module 64 of the speech synthesis apparatus 100 or 200 can perform emotion classification for the input situation explanation information using the DNN model. Emotion information corresponding to the situation explanation information may be classified into "anger", "boredom", "fear", "happiness" and "sadness" according to the emotion classification.

Further, when the input data includes audio data, speech data can be distinguished from non-speech data using the DNN model. In addition, the intelligent agent module 64 can perform emotion classification on the speech data using the DNN model. The speech data may be classified into "anger", "boredom", "fear", "happiness" and "sadness" according to the emotion classification.

First emotion information may be generated by matching an emotion to situation explanation through deep learning and first metadata corresponding to the first emotion information may be generated (S1140).

The first metadata corresponding to the first emotion information may be transmitted to the speech synthesis engine (S1150) and the speech synthesis engine may combine the first metadata with speech synthesis target text to perform speech synthesis.

FIG. 12 is a diagram for explaining an emotion vector according to an embodiment of the present disclosure. Referring to FIG. 12, when received data includes situation explanation information, the speech synthesis apparatus 100 or 200 can generate first emotion information on the basis of the situation explanation information.

For example, when situation explanation information included in a script is "with 1970s feeling", first information can be generated by performing learning for the situation explanation with respect to an emotion matching the explanation using a deep learning model based on a database or cloud. The first emotion information may be a vector in which weights have been set to a plurality of emotion elements EA1, EA2, EA3, EA4 and EA5. For example, the first emotion information is an emotion vector containing emotion information generated by applying a weight "0.3" to "neutral" EA1, applying a weight "0" to "anger" EA4 and "sad" EA5, applying "0.5" to "love" EA2 and applying "0.2" to "happy" for data of "with 1970s feeling".

As another example, when situation explanation information included in a script is "in a firm tone", an emotion vector containing emotion information generated by applying a weight "0.5" to "neutral" EA1 and "anger" EA4 and applying "0" to "sad" EA5, "love" EA2 and "happy" EA3 can be generated using a deep learning model based on a database or cloud with respect to emotions matching the corresponding explanation in order to generate emotion information about a firm tone.

FIGS. 13 to 17 illustrate a detailed speech synthesis process when data input to the speech synthesis apparatus does not include situation explanation information.

Figure 13:
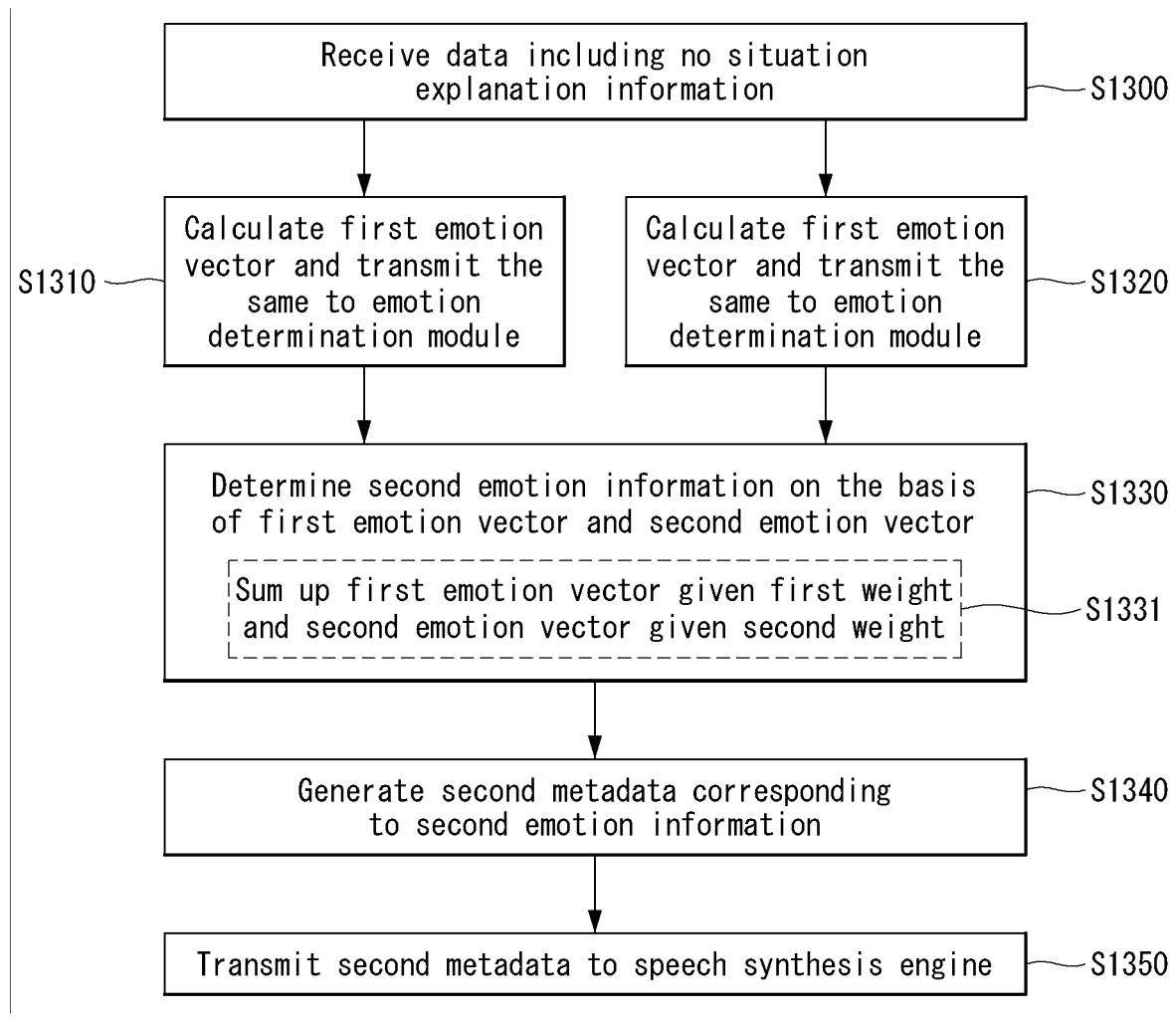
FIG. 13 is a flowchart of an emotion information based speech synthesis method for newly generating emotion information when data does not include situation explanation information according to an embodiment of the present disclosure.

FIG. 13 is a flowchart of an emotion information based speech synthesis method for newly generating emotion information when data does not include situation explanation information according to an embodiment of the present disclosure. The emotion information based speech synthesis method according to an embodiment of the present disclosure can be implemented in the TTS device described with reference to FIGS. 1 to 8.

Referring to FIG. 13, the speech synthesis apparatus 100 or 200 may receive data including no situation explanation information (S1300). When the received data does not include situation explanation information, the received data can be transmitted to a semantic analysis module and a context analysis module.

The speech synthesis apparatus 100 or 200 can analyze semantics in sentences of the receive data. The semantic analysis module may calculate a first emotion vector on the basis of an emotion element included in the data from which an emotion can be inferred and transmit the first emotion vector to an emotion determination module (S1310).

For example, a message may include at least one sentence, semantic analysis in the sentence may be based on an emotion element included in the sentence from which an emotion can be inferred. The emotion element from which an emotion can be inferred may include at least one of a symbol, an emoticon and a text (word). Accordingly, it is possible to determined that sentences have different pieces of emotion information through semantic analysis in sentences.

Further, even in the case of the same text, a user who delivers the text may have various intentions (emotions), and thus the speech synthesis apparatus 100 or 200 can infer emotions through semantic analysis in sentences on the basis of various emotion elements.

When a plurality of emotion elements is extracted from one sentence, the speech synthesis apparatus 100 or 200 can infer emotion information to be reflected in the sentence by combining the plurality of emotion elements. Further, when one sentence includes a plurality of emotion elements, the speech synthesis apparatus 100 or 200 may generate second emotion information by additionally applying a larger weight to a context analysis result value.

The first emotion vector is a vector representing an emotion item such as "neutral", "love", "happy", "anger" or "sad" and can be defined as a weight applied to each of the aforementioned plurality of emotion elements (or emotion items or emotion attributes). Here, the sum of weights applied to the plurality of emotion elements can be normalized.

Further, the speech synthesis apparatus 100 or 200 may analyze a context in a plurality of sentences constituting the received message (S1320).

The speech synthesis apparatus 100 or 200 can generate the second emotion information on the basis of the entire context of the message. Even in the case of the same sentence, a case in which semantic analysis in the sentence is not performed may occur and the emotion of a message sender may change over time in a message transmission/reception process. In this case, it is necessary to generate the second emotion information in consideration of the entire context of the message.

The speech synthesis apparatus 100 or 200 may generate the second emotion information on the basis of a semantic analysis result and/or a context analysis result in sentences (S1330).

Specifically, a first emotion vector calculated by the semantic analysis module and a second emotion vector calculated by the context analysis module can be transmitted to the emotion determination module, and the emotion determination module can determine the second emotion information on the basis of the first emotion vector and the second emotion vector.

More specifically, the emotion determination module sums up the first emotion vector given a first weight and the second emotion vector given a second weight (S1331).

The speech synthesis apparatus 100 or 200 may generate second metadata corresponding to the second emotion information corresponding to the sum of the first emotion vector and the second emotion vector (S1340).

The generated second metadata may be transmitted to the speech synthesis engine, and the speech synthesis engine may add the second metadata to speech synthesis target text of the received data to perform speech synthesis (S1350).

FIGS. 14A and 14B are diagrams for explaining an emotion vector according to an embodiment of the present disclosure. Referring to FIG. 14A, when received data M1 is "I lovey you", the speech synthesis apparatus 100 or 200 calculates a first emotion vector through the semantic analysis module. The first emotion vector may be a vector in which weights have been respectively set to a plurality of emotion elements EA1, EA2, EA3, EA4 and EA5. For example, the first emotion vector is an emotion vector containing emotion information generated by applying a weight "0" to "neutral" EA1, "anger" EA4 and "sad" EA5, applying "0.9" to "love" EA2 and applying "0.1" to "happy" EA3 for the data M1 "I love you".

Although FIG. 14B illustrates an example of generating an emotion vector on the basis of the meaning of a word (or text) in a sentence, different emotion vectors may be set for the same text.

FIGS. 15A to 15C illustrate another example in which the semantic analysis module calculates the first emotion vector by analyzing the meaning of text (data).

Referring to FIGS. 15A to 15C, while text "Where are you" may have the same semantic contents, the speech synthesis apparatus 100 or 200 according to an embodiment of the present disclosure may calculate different emotion vectors for the case.

For example, in the case of FIG. 15A, a symbol used along with the text (Where are you) is a question mark and thus is determined to be a neutral emotion element, and the first emotion vector for "Where are you?" can be calculated by applying a weight "1" to "neutral" among the plurality of emotion items. In the case of FIG. 15B, symbols used along with the text (Where are you) are a question mark "?" and a special symbol "^^" and the first emotion vector for "Where are you?^^" can be calculated by respectively applying weights "0.6" and "0.4" to "love" and "happy" among the plurality of emotion items. In the case of FIG. 15C, a symbol used along with the text (Where are you) is "--:;" which is a combination of special symbols and the first emotion vector for "Where are you?^ ^" can be calculated by respec-
tively applying weights "0.8" and "0.2" to "anger" and "sad" among the plurality of emotion items. That is, the speech synthesis apparatus 100 or 200 can calculate different first emotion vectors for the same text through semantic analysis.

Hereinafter, a process of calculating the second emotion vector through context analysis will be described with reference to FIGS. 16A and 16B.

FIGS. 16A and 16B illustrate an example in which the context analysis module analyzes the context of text (data) to calculate the second emotion vector.

Referring to FIGS. 16A and 16B, both may include a plurality of sentences in received text (data) and different second emotion vectors may be set for the current sentence "Where are you?" M22. For example, in the case of FIG. 16A, although a weight "1" may be applied to the emotion item "neutral" when determination is carried out only using the current sentence "Where are you?", a larger weight can be applied to the emotion item "love" or "happy" for the current sentence "Where are you?" when the previous sentence "I miss you" is considered through context analysis. Here, a case in which the entire weight is applied to "love" is described. Further, in the case of FIG. 16B, although the weight "1" may be applied to the emotion item "neutral" when determination is carried out only using the current sentence "Where are you?", the second emotion vector can be calculated by respectively applying weights "0.8" and "0.2" to the emotion items "anger" and "sad" for the current sentence "Where are you?" in consideration of the previous sentence "the appointed time has passed a long time ago" through context analysis.

FIG. 17 illustrates an example of generating final emotion information on the basis of the first emotion vector and the second emotion vector when received data does not include situation explanation information according to an embodiment of the present disclosure.

Referring to FIG. 17, the emotion determination module may determine second emotion information for received data M3 according to Equation 1.

$$EV = W_s SEVs + W_c SEVc \qquad [\text{Equation 1}]$$

Here, EV is an emotion vector, Ws is a first weight applied to a first emotion vector according to semantic analysis in a sentence, EVs is the first emotion vector, Wc is a second weight applied to a second emotion vector according to context analysis, and EVc is the second emotion vector. In addition, the sum of the first weight Ws and the second weight Wc is 1.

As a result of semantic analysis in the current sentence (Where are you?) of the received message M3, weights 0.6 and 0.4 can be respectively applied to emotion vector items "love" and "happy" with respect to the first emotion vector EVs. In addition, a weight 0.1 can be applied to the emotion vector item "love" with respect to the second emotion vector EVc as a result of context analysis.

Here, the emotion determination module can adaptively control the first weight Ws and the second weight Wc depending on degrees of contribution of a semantic analysis result and a context analysis result to determination of emotion information of a message.

While the first weight Ws and the second weight Wc can be initially set to 0.5, the second weight Wc may be increased to be larger than the first weight Ws, as shown in FIG. 17, for example, when a plurality of sentences constituting a message is determined to have continuity. The emotion determination module can set the first weight Ws to 0.4 and set the second weight Wc to 0.6 according to an example. Accordingly, the first weight Ws can be applied to the first emotion vector EVs, the second weight Wc can be applied to the second emotion vector EVc and the two emotion vectors can be summed. As a result, vector values respectively corresponding to a plurality of emotion items constituting the emotion vector EV can be calculated, as illustrated in FIG. 17. For example, "neutral" 0.0, "love" 0.84, "happy" 0.16, "anger" 0.0 and "sad" 0.0 can be calculated.

The emotion determination module can transmit the calculated vector values to the speech synthesis engine. For example, vector values corresponding to the plurality of emotion items can be transmitted in a sequence form or a one-dimensional matrix form to the speech synthesis engine. For example, the vector values can be transmitted in the form of [0.0, 0.84, 0.16, 0.0, 0.0].

It is possible to provide more lively and realistic speech synthesis results to a user by combining emotion information to perform speech synthesis through the above-described method and embodiments.

Further, the speech synthesis method according to an embodiment of the present disclosure can be applied in various patterns.

For example, the speech synthesis method according to an embodiment of the present disclosure can be applied to audio books. Although conventional audio books output speech synthesized in the same tone, an embodiment of the present disclosure can realize audio books based on emotion information by analyzing semantics and contexts of the audio books. Furthermore, audio books based on user specific emotion information can be realized by combining emotion information in a manner preferred by each user according to user choice to synthesize speech.

Moreover, in the case of multimedia content (movies, dramas, animation dubbing, etc.), for example, conventional methods output dialogues through speech synthesis in the same tone, whereas embodiments of the present disclosure can output speech synthesized with various emotions depending on dialogues and situations such that users can experience realistic content, Further, when speech data in a foreign language is provided, emotions may be extracted from the speech data and used for speech synthesis.

In addition, in the case of a navigation device, for example, conventional methods perform route guidance with synthesized speech in the same tone, whereas embodiments of the present disclosure can provide speech in various tones depending on driving situations to appropriately warn carelessness of drivers and warning occurrence situations.

Furthermore, a chatbot, for example, can speak in a voice with various emotions and styles depending on situations while speaking to a user.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state drive (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A speech synthesis method based on emotion information, the method comprising:
receiving data;
extracting speech synthesis target text from the data;
generating first emotion information on the basis of situation explanation information when the data includes the situation explanation information and generating first metadata corresponding to the first emotion information;
generating second emotion information based on semantic analysis and context analysis of the data when the data does not include situation explanation information and generating second metadata corresponding to the second emotion information; and
adding one of the first metadata and the second metadata to the speech synthesis target text to synthesize speech corresponding to the data.

2. The speech synthesis method of claim 1, wherein the situation explanation information includes at least one of the sex and age of a speaker, a time or atmosphere.

3. The speech synthesis method of claim 1, wherein the data further includes audio data recorded in a foreign language.

4. The speech synthesis method of claim 3, further comprising calculating an emotion vector on the basis of the audio data recorded in a foreign language,
wherein the first metadata is generated based on the first emotion information and the emotion vector.

5. The speech synthesis method of claim 3, wherein each piece of information included in the data includes an identifier for identifying the information.

6. The speech synthesis method of claim 1, wherein the first emotion information and the first metadata are generated through DNN learning.

7. The speech synthesis method of claim 6, wherein the DNN learning is performed based on an emotion expression learning model, and the emotion expression learning model is received from a cloud server.

8. The speech synthesis method of claim 1, wherein the first metadata and the second metadata are described in the form of a markup language and the markup language includes a speech synthesis markup language (SSML).

9. The speech synthesis method of claim 8, wherein the SSML includes an element indicating an emotion attribute,
wherein the emotion attribute includes at least one of "neutral", "love", "happy", "anger", "sad", "worry" or "sorry".

10. The speech synthesis method of claim 9, wherein vector values related to respective emotion attributes are represented in a sequence form or a one-dimensional matrix form and transmitted to a speech synthesis engine.

11. The speech synthesis method of claim 1, wherein the generating of the second emotion information comprises:
calculating a first emotion vector based on an emotion element included in the data from which an emotion can be inferred through semantic analysis of the data;
calculating a second emotion vector based on the entire context of the data through context analysis of the data; and
summing up the first emotion vector given a first weight and the second emotion vector given a second weight.

12. The speech synthesis method of claim 11, wherein the first emotion vector is defined as a normalized weight sum applied to a plurality of emotion attributes, and the second emotion vector is defined as a normalized weight sum applied to the plurality of emotion attributes.

13. The speech synthesis method of claim 8, wherein weights applied to the plurality of emotion attributes constituting the first emotion vector are applied in consideration of symbols or graphical objects included in the data as a result of reasoning of semantic contents included in the data.

14. The speech synthesis method of claim 8, wherein weights applied to the plurality of emotion attributes constituting the second emotion vector are applied in consideration of a context in sentences from which a context flow can be inferred.

15. The speech synthesis method of claim 1, further comprising receiving information about a voice preferred by a user,
wherein user specific speech synthesis is performed based on the information about the voice preferred by the user.

16. The speech synthesis method of claim 1, further comprising:
performing an initial access procedure along with a user equipment (UE) by periodically transmitting a synchronization signal block (SSB);
performing a random access procedure along with the UE; and
transmitting an uplink grant to the UE for scheduling of transmission of the data.

17. The speech synthesis method of claim 16, wherein the performing of the random access procedure comprises:
receiving a PRACH preamble from the UE; and
transmitting a response to the PRACH preamble to the UE.

18. The speech synthesis method of claim 17, further comprising performing a downlink beam management (DL BM) procedure using the SSB.

19. The speech synthesis method of claim 17, further comprising:
transmitting configuration information of a reference signal related to beam failure detection to the UE; and
receiving a PRACH preamble for requesting beam failure recovery from the UE.

20. A speech synthesis apparatus based on emotion information, comprising:
a memory for storing data;
a speech synthesizer for synthesizing speech corresponding to the data; and
a processor for controlling the speech synthesizer such that the speech synthesizer performs a speech synthesis operation based on emotion information on the basis of whether the received data includes situation explanation information,
wherein the processor is configured:
to extract speech synthesis target text from the data and transmit the speech synthesis target text to the speech synthesizer;
to generate first emotion information based on situation explanation information when the data includes the situation explanation information, generate first metadata related to the first emotion information and transmit the first metadata to the speech synthesizer; and
to generate second emotion information based on at least one of an emotion element from which an emotion included in the data can be inferred and the context of the data when the data does not include situation explanation information, generate second metadata corresponding to the second emotion information and transmit the second metadata to the speech synthesizer,
wherein the speech synthesizer adds one of the first metadata and the second metadata to the speech synthesis target text to synthesize speech corresponding to the data.

* * * * *